Patented Feb. 7, 1933

1,896,842

UNITED STATES PATENT OFFICE

CHARLES STEWART FERGUSON, OF TROY, NEW YORK, ASSIGNOR TO GENERAL ELECTRIC COMPANY, A CORPORATION OF NEW YORK

PHENOL-ALDEHYDE-DRYING OIL RESIN COMPOSITION AND PROCESS OF MAKING SAME

No Drawing.   Application filed March 13, 1931.   Serial No. 522,529.

The present invention relates to liquid coating compositions and is more especially concerned with a varnish of the type comprising a phenolic resinous composition and a drying oil homogeneously united therewith.

A principal object of this invention is to prepare a liquid coating composition which will maintain its liquid state at ordinary temperatures for prolonged periods of time, that is, without polymerizing and which will yield a film on baking which is flexible, tough and strong and of good electrical insulation value.

Another object of the invention is to prepare such a composition in a simple manner employing a single substance as a combined catalyst for the reaction and blending agent for incorporating the oil into the resinous mass.

A further object is to produce a composition of the character set forth in which the oil is homogeneously blended with the resinous ingredients and in such a manner that no separation thereof occurs on standing of the composition.

Other and further objects of the invention will be apparent as the description thereof proceeds.

For a consideration of what is believed to be novel and the invention attention is directed to the following specification and the claims appended thereto.

In order that a liquid coating composition of the type with which this invention is concerned may be practical it is necessary that it should be prepared from relatively cheap and readily available materials, the process for its preparation should be simple and should yield in every case uniform results, and the product should remain liquid and clear on standing and be capable of being cured expeditiously.

In carrying out the invention to attain the results enumerated and the objects desired, it is preferred to use as the phenolic ingredient practically pure xylenol (or mixtures of the xylenols). It has been found in actual experience that the xylenols react better, more completely than any of the other phenolic bodies and give a uniform product which cures expeditiously. In addition substantially pure xylenol is obtainable in the form of commercial cresylic acid and is relatively cheap and readily available. With the xylenol is employed an aldehyde, preferably paraformaldehyde, because of its physical and chemical characteristics.

In order to expedite the reaction between the xylenol and the aldehyde a catalyst is employed. A salient feature of the present invention is the specific catalyst which is employed and its important function in the reaction. The catalyst chosen also acts as a blending agent to incorporate the drying oil with the other ingredients. As the catalyst an ethanolamine, for example, triethanolamine, is employed. It has been found that this ingredient promotes the reaction of the xylenol and aldehyde giving a liquid resinous product at normal temperatures. At the same time it enables the blending directly with the xylenol and aldehyde of a drying oil, such as China-wood oil, to give a clear, completely blended liquid product.

As a specific example of the invention and the process of preparing the liquid coating composition the following is given:

|  | Pounds |
|---|---|
| Cresylic acid (xylenol b. p. approximately 211°–232° C.) | 45 |
| Paraformaldehyde | 10.75 |
| Triethanolamine | 1.5 |
| Raw China-wood oil | 47.75 |
| Solvent naphtha | 8 |
| Mineral spirits | 16 |

The cresylic acid, paraformaldehyde, triethanolamine and China-wood oil are weighed in an enamelled iron kettle and the latter is heated over a low fire slowly to 110° to 115° C. The mass is held at that temperature during the entire process of cooking to the end point, which is determined by testing a small pill of the material on a hot plate. The requisite end point is a 10 to 15 second cure at 200° C. of a small pill of the material. At this point the cooked mass is removed from the fire and cut, as soon as possible, with the previously mixed solvents.

An alternative method of preparing the liquid coating composition is as follows:

| | Per cent by weight |
|---|---|
| Cresylic acid (xylenol b. p. approximately 211° to 232° C.) | 37.9 |
| Paraformaldehyde | 8.1 |
| Triethanolamine | 1.2 |
| Raw China-wood oil | 32.5 |
| Solvent naphtha | 20.3 |

About 6.1 parts of the China-wood oil is placed in an open enameled iron kettle with the cresylic acid, paraformaldehyde and triethanolamine. The temperature is run up to 110° to 115° C., and held there with occasional stirring until a small pill of the resin cures in 4 to 6 seconds on a 200° C. hot plate. At this point there is added another 6.1 parts of the oil and the mass stirred until the resin is clear both in the kettle and in a cold pill. The remainder of the oil is then added and stirred in as before. When the resin is clear, the kettle is removed from the fire and the solvent naphtha mixed in.

The liquid coating composition so prepared remains clear and unchanged in viscosity for a prolonged period of time and the cure is rapid. This composition bakes in a short time to a tough flexible film which is exceptionally resistant to water, acids and alkali and has very high dielectric strength.

The incorporation of driers is not necessary. If desired such driers as the usual lead, manganese and cobalt compounds may be employed.

The resulting product in each case is a baking varnish and may be cured very easily and rapidly to a flexible film. The liquid coating composition of this invention is especially adapted as a coating material for coils of motors and other electrical apparatus. For use in manufacture of laminated stock, molding compounds and generally where a composition of the above character is desired, the composition is excellent.

What I claim as new and desire to secure by Letters Patent of the United States, is:

1. The process of preparing a liquid coating composition which comprises reacting substantially pure xylenol, an aldehyde, triethanolamine and a drying oil.

2. The process of preparing a liquid coating composition, which comprises reacting substantially pure xylenol, paraformaldehyde, triethanolamine and China-wood oil at 110° to 115° C. until a clear resinous composition results.

3. The process of preparing a liquid coating composition, which comprises heating a mixture of substantially pure xylenol, paraformaldehyde, triethanolamine, and China-wood oil slowly to 110° to 115° C., maintaining the mass at this temperature until a small pill of the material cures in 10 to 15 seconds on a 200° C. hot plate, and cutting said mass with a solvent therefor.

4. The process of preparing a liquid coating composition which comprises reacting a mixture of substantially pure xylenol, an aldehyde and triethanolamine with a drying oil by blending with the mixture small fractions at a time of the total oil employed and dissolving the entire reacted mass in a solvent therefor.

5. The process of preparing a liquid coating composition which comprises reacting a mixture of substantially pure xylenol, paraformaldehyde and triethanolamine with China-wood oil, by blending with the mixture small fractions at a time of the total oil employed, and dissolving the entire reacted mass in a solvent therefor.

6. The process of preparing a liquid coating composition which comprises reacting a mixture of substantially pure xylenol, paraformaldehyde and triethanolamine with China-wood oil as follows: adding a small fraction of the total China-wood oil employed to the mixture and heating the mass at 110° to 115° C. to a 4 to 6 second cure on a 200° C. hot plate, adding another similar fraction of oil to the mass and heating until the latter is clear, adding the remaining portion of oil, heating until the mass is clear, and dissolving the reacted mass in a solvent therefor.

7. A liquid coating composition which is the product of reaction of substantially pure xylenol, an aldehyde, triethanolamine and a drying oil, said product being dissolved in a solvent therefor.

8. A liquid coating composition which is the product of reaction of substantially pure xylenol, paraformaldehyde, triethanolamine and China-wood oil, said product being dissolved in a solvent therefor.

9. A liquid resinous composition consisting of the product of reaction of a cresylic acid (b. p. approximately 211–232° C.), paraformaldehyde, triethanolamine and China-wood oil.

10. A resinous composition which is the product of reaction of substantially pure xylenol, an aldehyde, triethanolamine and drying oil.

11. A liquid coating composition which is the product of reaction of approximately 45 parts by weight of substantially pure xylenol, approximately 10.75 parts by weight of paraformaldehyde, approximately 1.5 parts by weight of triethanolamine and approximately 47.75 parts by weight of raw China-wood oil, said product being dissolved in a solvent therefor.

In witness whereof, I have hereto set my hand.

CHARLES STEWART FERGUSON.